Dec. 9, 1958 W. JUDA ET AL 2,863,813
METHOD OF ELECTRODIALYZING AQUEOUS SOLUTIONS
Filed Sept. 14, 1956 2 Sheets-Sheet 1

INVENTORS:
Walter Juda
Wayne A. McRae
BY
ATTORNEY

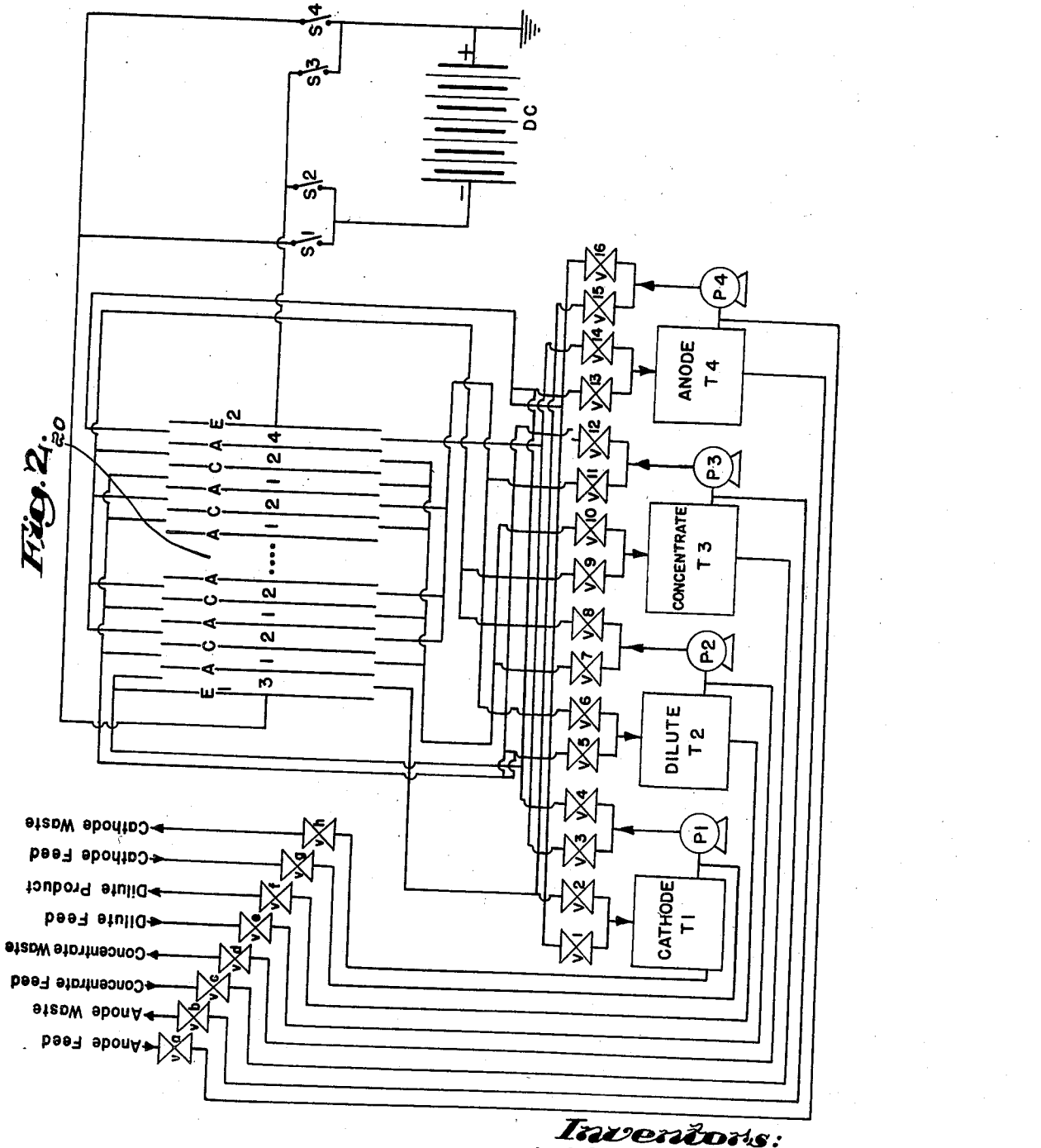

United States Patent Office 2,863,813
Patented Dec. 9, 1958

2,863,813

METHOD OF ELECTRODIALYZING AQUEOUS SOLUTIONS

Walter Juda, Lexington, and Wayne A. McRae, Arlington, Mass., assignors to Ionics, Incorporated, Cambridge, Mass., a corporation of Massachusetts Application September 14, 1956, Serial No. 619,033

9 Claims. (Cl. 204—180)

This case relates to a method and apparatus for improvements in the electrodialysis of aqueous solutions containing minor quantities of organic salts to be removed therefrom. More specifically, the present invention is directed to the prevention or overcoming of the fouling of membranes in the electrodialysis of aqueous solutions containing minor components of salts to be removed therefrom.

The electrodialysis of aqueous solutions is effected in multi-membrane demineralizers having alternating diluting and concentrating chambers with spaced alternating cation and anion permselective membranes therebetween defining alternating donor and donee solution chambers containing the diluting and concentrating solutions, respectively. Such treatment has frequently suffered from fouling of the membranes, usually the anion-exchange selective membranes, by substances present in the solution to be electrodialyzed and evidenced by a considerable increase in resistance of the membrane demineralizer over a period of time. This increase in resistance during the demineralization of the solutions is believed due to the precipitation, clogging, and imbedding of the membranes by insoluble salts and/or organic medium molecular weight compounds which originate from the solutions being electrodialyzed.

Electric membrane demineralizers of the type referred to above are fully described in patent application Serial No. 428,072 to a Process and Apparatus for Electrodialyzing Liquids, filed May 6, 1954, to N. W. Rosenberg, and U. S. Patent No. 2,694,680 to Katz et al. issued November 13, 1954. The operation of these demineralizers over a period of time frequently resulted in gradual increase in resistance of the unit over periods of a few hundred hours to values which are so high as to render the process uneconomical. Under polarizing current conditions, a large increase in resistance occurs over periods of a few hours. The increase of resistance of the demineralizer was determined to be caused by the formation and precipitation of slightly soluble salts, slightly ionizable amino acids, colloid materials, etc., originating from the solutions being treated which were lodged or formed in situ within the membranes or tenaciously clinging to the surface of the same. Such fouling of membranes is encountered, for example, in the electrodialysis of sugar solutions, naturally occurring waters, industrial solutions, etc., which contain the noted offending materials.

Several methods have been devised for alleviating the long-term fouling of membranes under the circumstances described above. These methods include the addition of acid to the treating solutions, pre-ion exchange of the treating solutions for preliminary removal of polyvalent slightly soluble salts, use of activated charcoal or carbon for clarification or defecation of organic solutions such as sugar solutions, control of the Brix of sugar solutions to 20° to 40°, etc. Various degrees of success have been attained by these methods and it will be readily seen that costly and uneconomical considerations are involved in the use of these expedients.

It has now been found that the long-term fouling of the membranes under the circumstances described above may be at least partially overcome by periodic or cyclic reversal of the direction of the direct electric current and at the same time the periodic interchanging of the flows of the donor and donee solutions, so that chambers which were concentrate chambers and contained the waste stream become dilute chambers and contain the process stream, etc. For example, one may operate in each direction for eight hours. Owing to the intrinsically low holdup volume to throughput rate of an electric membrane demineralizer (i. e., low contact time), the loss of process (treating) solution on such reversal is negligible and may be readily recovered if desired. It appears that the effect of this expedient is electrically to remove during one cycle from the concentrate side of the anion membranes those interfering substances which fouled the dilute side during the previous cycle. It will be evident that this expedient suffers from the minor disadvantage that the average resistance of the membranes will always be somewhat higher than the unfouled value. Nevertheless, operation may apparently be continued many hundreds of hours without substantial increase above this average value. This case is continuation-in-part of applicants' parent case Serial No. 207,289, filed January 23, 1951, now Patent No. 2,767,135, issued October 16, 1956.

It has also been found that the above-described simultaneous reversal of current and diluting-concentrating chamber flow may be advantageously combined with the expedients of acid control of feed solutions, control of the Brix value of sugar solutions, etc. in the prevention of membrane fouling of electric membrane demineralizers.

The primary object of the invention is to stabilize the operating parameters in the electrodialysis of aqueous solutions containing minor quantities of salts to be removed therefrom.

Another object of the invention is to prevent the fouling of the anion-exchange selective membranes of electrodialysis demineralizers.

A further object of the invention is to increase the efficiency of demineralization.

A further object of the invention is to stabilize the resistance of the demineralizer to utilize more efficiently the highest permissable current density.

Another object of the invention is to provide apparatus of an electric membrane demineralizer to effect the objects of the described processes.

These and other objects and features of the invention will be more readily understood and appreciated from the following detailed description of the preferred embodiment thereof selected for purpose of illustration as shown in the accompanying drawings in which:

Figure 2 is a schematic flow diagram showing the complete system for demineralization employing the principle of cyclic and periodic reversal of the direction of the direct electric current with simultaneous periodic interchanging of the donor and donee chambers therewith.

Figure 1:
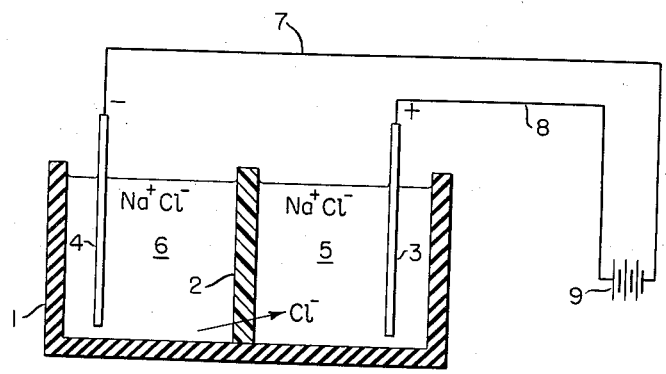
Figure 1 is a diagrammatic elevation in cross section of a simple cell divided into anode and cathode chambers by an ion-selective membrane.

The process of this invention in its basic embodiment may be carried out in the simple cell of Fig. 1. The solutions are held in a container 1 separated into anode and cathode chambers 5 and 6 respectively by the electrolytically conductive membrane 2. Electrodes 3 and 4 are present in the chambers 5 and 6 and contact any liquid contained within the chambers. Electrically conductive leads 7 and 8 connect the electrodes with a source of voltage, e. g. a D. C. battery 9. When an electric current is imposed, chlorine is evolved at electrode 3 and hydrogen at electrode 4. It is found that the current is carried across the membrane structure 2 almost completely by sodium ions passing out of chamber 5 into chamber 6 reducing the sodium ion content of the solution in chamber 5.

From the foregoing, it will be appreciated that upon constructing a cell with alternating anion and cation selective membranes defining chambers therebetween, an electrodialysis system would be constructed whereby a feed solution containing an electrolyte therein passing through alternate chambers would be completely depleted of the dissolved electrolyte therein. This is more clearly demonstrated in Fig. 2 as described below.

Figure 2 shows a system schematically illustrating the apparatus and operation of a recirculating demineralizer of the present invention wherein the stack of chambers 3, 1, 2, . . . 1, 2, 4, of demineralizer 20 is shown to be defined by spaced anion and cation selectively permeable membranes A and C, respectively, known per se, with end electrodes $E_1$ and $E_2$. Two sets of valves V are shown leading to and from tanks T by virtue of pumps P. Swithches S are all shown in open position, but their operation will be evident from the operating description below.

In the operation of the apparatus of the drawing when valves V1, V3, V5, V7, V9, V11, V13, and V15 and switches S1 and S3 are open, while simultaneously valves V2, V4, V6, V8, V10, V12, V14, and V16 and switches S2 and S4 are closed (note that in a hydraulic sense when a valve is closed, no solution flows, but in an electrical sense when a switch is closed, current flows), chambers 1 are diluting, chambers 2 are concentrating, chamber 3 contains an anolyte, chamber 4 contains a catholyte, electrode E1 is anodic, electrode E2 is cathodic, and the solutions pass in parallel upflow through the unit.

Upon the reversal of the system, by reversing switches S1 and S3 to S2 and S4 and valves V2, V4, V6, V8, V10, V12, V14, and V16 to valves V1, V3, V5, V7, V9, V11, V13, and V15 (automatically if desired at predetermined intervals), the concentrating and diluting chambers reverse along with the reversal of the electrode polarity, and tanks T1, T2, T3, and T4 remain as indicated in the drawing.

Preferably, such valves and switches are automatically operated, one group being open when the other group is closed.

Valves V$a$, V$b$, V$c$, V$d$, V$e$, V$f$, V$g$, and V$h$ control the input and output of the various streams in accordance with recirculating with continuous input and output (U. S. patent application Serial No. 428,072, filed April 29, 1954). For example:

(a) If V$a$ and V$b$ are both slightly open, permitting a flow less than that of pump P4, the anolyte may be termed "recirculating, continuous feed";

(b) If V$e$ and V$f$ are normally closed, except that V$f$ opens to empty tank T2 and when T2 is substantially empty, V$f$ closes and V$e$ opens until T2 is substantially full, the dilute stream may be termed "recirculating batch feed."

Suitable anion and cation selective membranes are fully disclosed in U. S. Patents 2,636,851, issued April 23, 1953, and 2,730,768, issued January 17, 1956.

Applications for patents in the United States have been filed covering the prevention of fouling of membranes in electric membrane demineralizers wherein naturally occurring waters such as brackish and sea waters, and organic solutions, such as aqueous sugar solutions, are adjusted to a pH on the acid side before or during passage through the demineralizer, U. S. applications Serial Nos. 558,283 and 558,284, filed January 10, 1956, to J. A. Marinsky et al. In the treatment of naturally occurring waters the pH of the concentrating stream is adjusted to between 5 and 7, preferably 6 and 7, while in the case of aqueous organic solutions, such as sugar solutions, the pH of the process stream was adjusted to between 3 and 5, preferably 3.5. On September 22, 1955, patent application Serial No. 535,804, to N. W. Rosenberg, was filed covering the demineralization of polyhydric solutions, such as aqueous sugar solutions, in multichamber electric membrane demineralizers of the type referred to herein, whereby enhanced efficiency of operation was obtained when the process stream was adjusted to concentrations (by the addition or removal of water) to a Brix of between 20° and 40°, preferably 30°.

The invention of the present case may very advantageously be combined with these teachings to effect optimum control and efficient demineralization of these solutions. The advantageous effect of adding periodic reversal of electrode polarity in conjunction with simultaneous interchange of the concentrating and diluting chambers to these procedures will be apparent and further demonstrated in the examples given below.

*Example 1.*—An electrodialysis unit, operated on sea water containing unidentified organic matter, was found to increase in resistance over a period of three weeks. The unit had 150 anion membranes, 150 diluting chambers, 150 cation membranes, and 151 concentrating chambers, with metallic electrodes inserted into the two concentrating or electrode chambers bounding each end of the unit. The area of each membrane exposed to current was 1.25 sq. ft. The entire unit passed 30 amperes at an impressed D. C. voltage of 150 volts, when initially filled with sea water, and reduced the salinity of 1000 gallons per day to 500 p. p. m. from 35000 p. p. m. After three weeks of operation this current had slowly fallen to 15 amperes, and the rate of demineralization had correspondingly dropped to 500 gallons daily. Reversal of electrical polarity was found to restore the current immediately to its former value of 30 amperes and to restore the demineralization rate to 1000 gallons daily, with the former diluting chambers now acting as concentrating chambers and vice versa. Periodic reversal at weekly intervals maintained an acceptable production rate.

*Example 2.*—The electrodialysis unit of Example 1 when operated on a brackish water with a high level of calcium (500 p. p. m. $CaCO_3$) and a moderate level of bicarbonate (200 p. p. m. as $CaCO_3$) was found to increase in resistance with continuous operation when initially operated at a voltage of 200 volts. The unit was constructed identical to that in Example 1 and produced a 5000 gallons per day of 500 p. p. m. product water from a feed water of 3000 p. p. m. total solids. After a period of 2 weeks' operation the electrical resistance was found to increase to the point where at the same applied voltage only 3000 gallons per day of water was being obtained. Adjustment of the pH of the concentrate stream to 6.2 by addition of 100 p. p. m. of $H_2SO_4$ and periodic reversal of the polarity daily intervals was found to restore the product rate to 5000 gallons per day level. Upon reversal of polarity it was necessary to interchange hydraulic connections so that the former concentrating chambers now act as diluting chambers and vice versa.

*Example 3.*—An electrodialysis unit was utilized to deash a sugar cane juice concentrated after lime defecation to 30° Brix. This concentrated juice was passed through the diluting chambers of a unit constructed identical to that in Example 1 above, and a stream initially 0.1 N in sodium chloride was passed through the concentrating chambers. A conductance reduction of 20% was obtained in the sugar stream when a flow of 15 G. P. M. of sugar was passed at an impressed voltage of 200 v. D. C., and a current of 20 amperes. Over a period of twelve hours, the electrical resistance of the system rose so that at the same voltage, only a 12% conductance reduction was obtained in the sugar juice.

Electrical reversal was found to immediately decrease the electrical resistance, and an 18% conductance reduction was obtained at the voltage of 200 v. D. C., when the sugar stream was diverted to the former concentrating chambers. Periodic reversal at four hour intervals maintained an average of 15% conductance reduction over several reversals.

*Example 4.*—An electrodialysis unit constructed identical to that in Example 1 was used to deash a backstrap molasses diluted to 22° Brix and adjusted to a pH of 3.5 by the addition of hydrochloric acid. Operation at 200 volts resulted in a 10% conductance reduction on molasses passed through the diluting chambers at a rate of 10 G. P. M.

Over a period of five days operation, this conductance reduction had decreased to 4%, at the same voltage and flow rate. Electrical polarity reversal immediately dropped the electrical resistance and the 10% conductance reduction was again obtained, by passing the molasses through the former concentrating chambers. Periodic reversal at daily intervals maintained an average demineralization per pass of 8%.

Having thus disclosed our invention and described in detail preferred embodiments thereof so that any person skilled in the art may practice it, we claim and desire to secure by Letters Patent:

1. The method of demineralizing aqueous solutions containing relatively minor components of electrolytes to be removed therefrom comprising: the steps of passing a first aqueous solution through the dilute chambers of a multi-chamber electric membrane demineralizer having a plurality of alternating concentrating and diluting chambers between two end electrode chambers, said concentrating and diluting chambers being free of electrodes, all of said chambers being defined between alternate anion and cation permselective membranes, passing a second aqueous electrolyte solution through the concentrating chambers of said demineralizer, passing a third electrolyte solution through the end electrode chambers, passing a direct electric current in series across the alternating concentrating and diluting chambers and membranes, periodically reversing the direction of passage of said electric current and simultaneously therewith interchanging the first and second solutions between their respective chambers.

2. The method of claim 1 wherein the aqueous solutions are selected from the group consisting of naturally occurring waters and aqueous organic solutions.

3. The method of claim 2 wherein the naturally occurring waters are brackish waters.

4. The method of claim 2 wherein the naturally occurring waters consist of sea water.

5. The method of claim 2 wherein the aqueous organic solutions are sugar solutions.

6. In the method of demineralizing naturally occurring waters containing minor components of electrolytes to be removed therefrom which includes the steps of passing said water as a first stream through the dilute chambers of a multi-chamber electric membrane demineralizer having a plurality of alternating diluting and concentrating chambers between two end electrode chambers said diluting and concentrating chambers being free of electrodes, said chambers being defined between alternate anion and cation permselective membranes, adding acid to a second water stream to a pH between about 6 and 7 and passing the same through the concentrating chambers, passing a third aqueous stream through said electrode chambers, and passing a direct electric current in series across said membranes and chambers, the steps of: periodically reversing the direction of the electric current and simultaneously therewith interchanging the first and second water streams between their respective chambers.

7. In a method of demineralizing sugar solutions containing minor components of electrolytes to be removed therefrom which includes the steps of adjusting the concentration of said sugar solution to a Brix in the range of about 20° to about 40° and passing said solution as a first stream through the dilute chambers of a multi-chamber electric membrane demineralizer having a plurality of alternating diluting and concentrating chambers with two end electrode chambers said diluting and concentrating chambers being free of electrodes, said chambers being defined between alternate anion and cation permselective membranes, passing a second aqueous electrolyte solution through the concentrating chambers and a third aqueous electrolyte solution through the end electrode chambers of said demineralizer, and passing a direct electric current in series across said membranes and chambers, the steps of: periodically reversing the direction of passage of said electric current and simultaneously therewith interchanging the first and second solutions between their respective chambers.

8. In the method of demineralizing sugar solutions containing minor components of electrolytes to be removed therefrom which includes the steps of adding an acid to a first said sugar solution to a pH between about 2 and about 5, passing said first solution through the dilute chambers of a multi-chamber electric demineralizer having a plurality of alternating diluting and concentrating chambers with two end electrode chambers said diluting and concentrating chambers being free of electrodes all defined between alternating anion and cation permselective membranes, passing a second aqueous electrolyte solution through the concentrating chambers and a third aqueous electrolyte solution through the end electrode chambers of said demineralizer, passing a direct electric current in series across the alternating membranes and chambers, the steps of: periodically reversing the direction of passage of said electric current and simultaneously therewith interchanging the first and second solutions between their respective chambers.

9. The method of claim 8 wherein the sugar solution is adjusted to a Brix of about 30° and acid is added thereto to a pH of about 3.5.

References Cited in the file of this patent

UNITED STATES PATENTS

| | | |
|---|---|---|
| 2,219,209 | Neufeld | Oct. 22, 1940 |
| 2,413,844 | Rawlings | Jan. 7, 1947 |
| 2,694,680 | Katz | Nov. 16, 1954 |
| 2,767,135 | Juda et al. | Oct. 16, 1956 |